United States Patent
Flohr et al.

(10) Patent No.: US 11,523,029 B2
(45) Date of Patent: Dec. 6, 2022

(54) ARTIFICIAL INTELLIGENCE SCAN COLORIZATION

(71) Applicant: FARO Technologies, Inc., Lake Mary, FL (US)

(72) Inventors: Daniel Flohr, Stuttgart (DE); Louis Bergmann, Stuttgart (DE); Vadim Demkiv, Korntal-Münchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 74 days.

(21) Appl. No.: 17/215,139

(22) Filed: Mar. 29, 2021

(65) Prior Publication Data

US 2021/0321016 A1 Oct. 14, 2021

Related U.S. Application Data

(60) Provisional application No. 63/006,837, filed on Apr. 8, 2020.

(51) Int. Cl.
*G06K 9/00* (2022.01)
*H04N 1/46* (2006.01)
*H04N 9/04* (2006.01)
*H04N 5/232* (2006.01)
*G06T 5/00* (2006.01)
*G06V 20/00* (2022.01)

(52) U.S. Cl.
CPC ............ *H04N 1/465* (2013.01); *G06T 5/001* (2013.01); *G06V 20/00* (2022.01); *H04N 5/23238* (2013.01); *H04N 9/045* (2013.01); *G06T 2207/10024* (2013.01); *G06T 2207/20084* (2013.01)

(58) Field of Classification Search
CPC .... H04N 1/465; H04N 5/23238; H04N 9/045; G06T 5/001; G06T 2207/10024; G06T 2207/20084; G06T 2200/24; G06T 11/001; G06V 20/00; G06V 10/143; G06V 10/454; G06V 10/56; G01C 11/025
USPC ........................................................ 382/103
See application file for complete search history.

(56) References Cited

U.S. PATENT DOCUMENTS

2008/0204773 A1* 8/2008 Morgana ................ H04N 1/648
358/1.9

OTHER PUBLICATIONS

Dong et al., "Infrared Image Colorization Using a S-Shape Network", 2018 25th IEEE International Conference on Image Processing, Proceedings Oct. 7-10, 2018, 5 pages.

(Continued)

*Primary Examiner* — Stephen P Coleman
(74) *Attorney, Agent, or Firm* — Cantor Colburn LLP (57) ABSTRACT

Provided are embodiments for a method for performing colorization of scans. The method includes analyzing a scanner, a scan of an environment to identify one or more patterns within the scan, and obtaining a subset of colorization data of the environment. The method also includes predicting colors for the one or more patterns in the scan based on the subset of colorization data, and assigning the predicted colors to the one or more patterns in the scan to generate a colorized scan. The method includes displaying the colorized scan, wherein the colorized scan combines the scan and the predicted colorization data by assigning the predicted colorization data to the one or more patterns in the scan. Also provided are embodiments for a system for performing the colorization of scans.

20 Claims, 6 Drawing Sheets

(56) References Cited

OTHER PUBLICATIONS

Gupta et al., "Learning Rich Features from RGB-D Images for Object Detection and Segmentation: Supplementary Material", 2014, pp. 1-26.
Zhang et al., "Real-Time User-Guided Image Colorization with Learned Deep Priors", arXiv:1705.02999v1, May 8, 2017, pp. 1-11.

* cited by examiner

ARTIFICIAL INTELLIGENCE SCAN COLORIZATION

CROSS-REFERENCE TO RELATED APPLICATIONS

This application claims the benefit of U.S. Provisional Application No. 63/006,837, filed Apr. 8, 2020, and entitled "ARTIFICIAL INTELLIGENCE SCAN COLORIZATION", the content of which is incorporated herein by reference in its entirety.

BACKGROUND

The subject matter disclosed herein relates to generally to optical scanning, and more particularly to performing the colorization of scanned images using artificial intelligence.

Laser scanners are typically used for scanning closed or open spaces like interior spaces of buildings, industrial installations, and tunnels. Laser scanners are used for many purposes, including industrial applications and accident reconstruction applications. A laser scanner can be used to optically scan and measure objects in a volume around the laser scanner. Laser scanners collect a variety of data points representing objects in the surrounding volume. Such data points are obtained by transmitting a beam of light onto the objects in the volume and collecting the reflected or scattered light to determine, for each point, a distance, two angles (for example, an azimuth and a zenith angle), and a gray scale value (i.e., a quantity related to the irradiance of the scattered light returned to the scanner). This raw scan data is collected, stored and sent to a processor or processors to generate a scanner image that represents the objects measured in the three dimensional (3D) volume surrounding the scanner, the scanner image being displayed on a monitor or similar device. In order to generate the scanner image, at least four values are collected for each data point. These four values may be the distance, two angles, and gray scale value, as described above, or they may be transformed values such as the x, y, and z coordinates, in addition to the gray scale value.

Many contemporary laser scanners also include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space if the field of view needs adjusting. In addition, the camera digital images may be transmitted to a processor to add color to the scanner image. In order to generate a color scanner image, at least six values (three positional coordinates such as x, y, z; and red value, green value, blue value or "RGB") are collected for each data point.

One drawback of conventional techniques for colorizing scanned data is that it requires the colorization data for a scanned image to be captured during the scanning process. However, this comes at a cost that requires a considerable amount of additional processing time. For example, in existing systems, responsive to scanning the environment a color camera that is operably coupled to the system is operated to take pictures of the previously scanned environment. Subsequently, the colors (pixels) are superimposed on the scanned images (point cloud) to colorize them. This increases processing burden on the system.

Another drawback includes colorizing infrared images. Infrared images measure the reflectance off of the surface of an object. The light reflected off of the surface is based on the material. If the scans are obtained using infrared imaging, additional processing will be required because the infrared images will not have the information related to the hue and/or saturation of the image. The optical power of the reflected light is received, and then a grayscale image is obtained for each coordinate point. Colorizing an infrared image is more challenging than colorizing a gray scale image. Often times the colorization of the infrared images are often blurry and distorts a substantial amount of detail.

Accordingly, and while existing scanner processing systems may be suitable for their intended purpose, there remains a need in the art for scanner processing systems that having the features described herein.

This background information is provided, and no admission is necessarily intended, nor should be construed, that any of the preceding information constitutes prior art against the present invention.

BRIEF DESCRIPTION

According to one embodiment, a method for performing colorization of scans is provided. The method includes analyzing, using a scanner, a scan of an environment to identify one or more patterns within the scan; obtaining a subset of colorization data of the environment; and predicting, using a processor, colors for the one or more patterns in the scan based on the subset of colorization data. The method also includes assigning the predicted colors to the one or more patterns in the scan to generate a colorized scan; and displaying the colorized scan, wherein the colorized scan combines the scan and the predicted colorization data by assigning the predicted colorization data to the one or more patterns in the scan.

According to another embodiment, a system configured to perform colorization of a scan using artificial intelligence is provided. The system includes one or more processors; and at least one memory. The memory includes instructions that, upon execution by at least one of the one or more processors, cause the one or more processors to be operable to analyze, using a scanner, a scan of an environment to identify one or more patterns within the scan; obtain a subset of colorization data of the environment; and predict colors for the one or more patterns in the scan based on the subset of colorization data. The memory also includes instructions to cause the one or more processors to be operable to assign the predicted colors to the one or more patterns in the scan to generate a colorized scan; and display the colorized scan, wherein the colorized scan combines the scan and the predicted colorization data by assigning the predicted colorization data to the scan.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Contemporary techniques for colorizing scan data require the colorization data to be obtained during the initial scan process. This is a very complex and time-consuming task. In addition, colorizing an infrared image is more challenging when compared to colorizing gray scale images, since standard gray scale values have to be predicted in addition to hue and saturation information.

Also, prior art processing systems that are used to colorize a scan typically require at least 70 images in order to perform the colorization process. Other systems may require greater or fewer number of input images. By using the techniques described herein a reduction in the number of seed images from 70 to approximately 5-10 images is now realized where artificial intelligence is used to fill in the missing information or gaps. In some of the techniques described herein, a single image obtained from a panoramic camera coupled to the scanner can be used. In such a case, an image having a lower resolution than the scan resolution is acquired and is further processed with color information and intensity information from the laser which is used as an input to a neural network. The processing of the information is used to generate high resolution color information for the scan. In the case of the using the panoramic camera or other camera systems mounted to the scanner, a parallax may occur. Due to the parallax error, there will be uncolored areas when mapping the image to the laser scan using convention algorithms. By using the techniques described herein, the AI and the color information from the rest of the image is used to fill in and colorize these areas.

The shortcomings in the prior art process may be eliminated through the use of a processor or processing system that leverages artificial intelligence (AI) to predict the colorization of the scanned image. An example of the type of AI described in more detail herein below includes convolutional neural networks. Artificial intelligence and machine learning techniques have been utilized in many applications to streamline various processing including identifying and classifying objects. In addition, these technologies can learn from various datasets and converge on the proper classification with a high degree of certainty. The artificial intelligence is used herein to fill in the gaps or to increase the resolution of the color information of a scanned image and colorize them. Therefore, not as many images are needed to seed the algorithm.

Also, the techniques described herein provide the ability to colorize a scanned project using AI after the project was already performed. Therefore, the operators are not required to perform the additional capture of the colorization data during the initial scan. These techniques provide a balance between color quality of the scan and time/cost savings during processing.

A neural network is used to provide a model to identify objects and colorize the objects within the scan and further identify or assign a corresponding color to the object. In addition, an edge detection process can be applied to the grayscale representation to maintain the integrity of the objects in the scan. As more and more data is acquired by the system, the network learns to optimize the colorization process for subsequently scanned image.

One example of a convolutional neural network (CNN) of interest includes the S-network. The S-network allows for the reduction of images to utilize as few as 5-10 images as the seed for the CNN, and the CNN is then able to fill in any remaining gaps in the colorization of the originally scanned image. This provides an increased time savings for the user during the scanning process. In other embodiments, the techniques described herein are able to assign colors without using any seed images. The CNN identifies patterns from previous datasets and assigns colors based on the identified patterns. For example, grass can be colored green, brick buildings can be reddish-brown, and so on. The CNN can be configured to recognize various patterns in an image. These patterns can represent and be associated with different objects. For example, the CNN can be configured to identify a roadway, mulch or a brick surface, etc.

Some embodiments described herein will provide a better image than simply a reflectance image by colorizing the image. Also, some embodiments described herein enable the colorization of the previously scanned data. Therefore, the color capture does not have to be enabled during the scan or immediately subsequent to the scan process.

The present invention relates to performing colorization of scans using artificial intelligence. Embodiments of the invention provide advantages in colorizing infrared scans and grayscale scans while maintaining the quality of the original scans. In addition, embodiments of the invention use artificial intelligence to predict the colorization of the original scans to reduce the amount of seed data that is required. Embodiments of the invention also provide advantages by allowing previously scanned images to be colorized. In one or more embodiments of the invention, the colorization data can be predicted when limited colorization data exists in one or more regions of the image. In other embodiments, colorization data can be predicted when some colorization data exists, but the colorization data is low resolution colorization data. In such a case, the resolution of the image can be increased.

Figure 1:
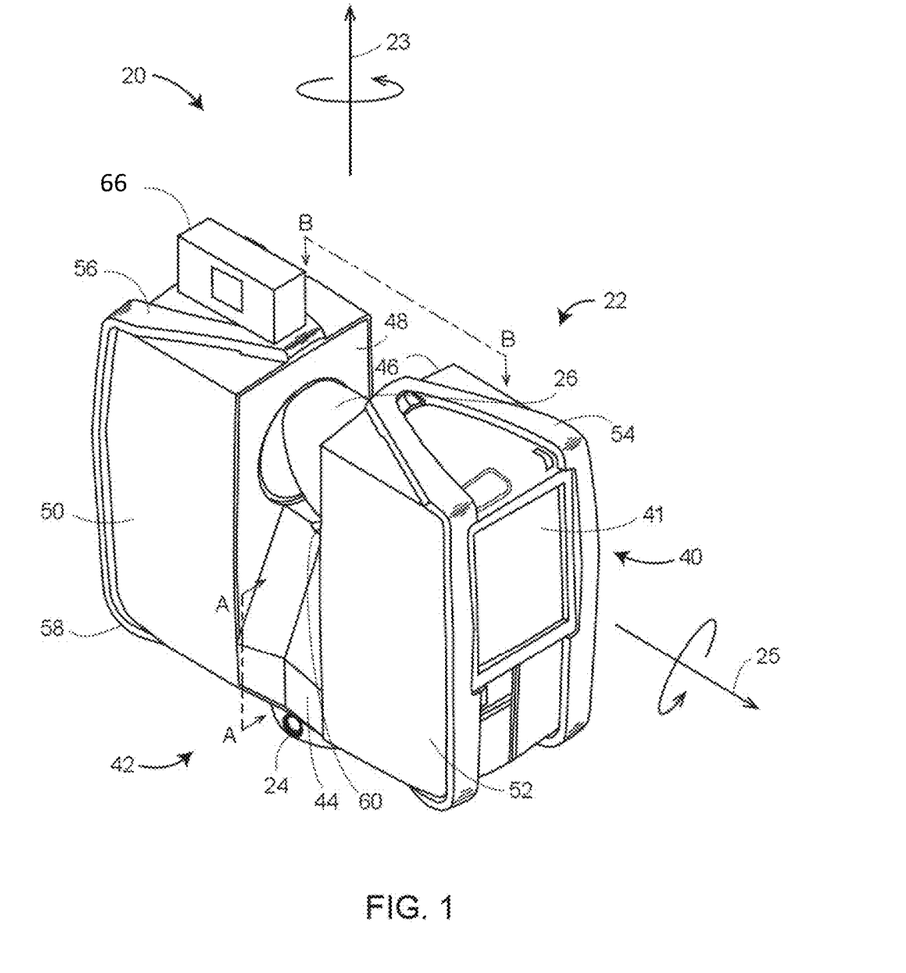
FIG. 1 is a perspective view of a laser scanner in accordance with an embodiment of the invention.
Figure 2:
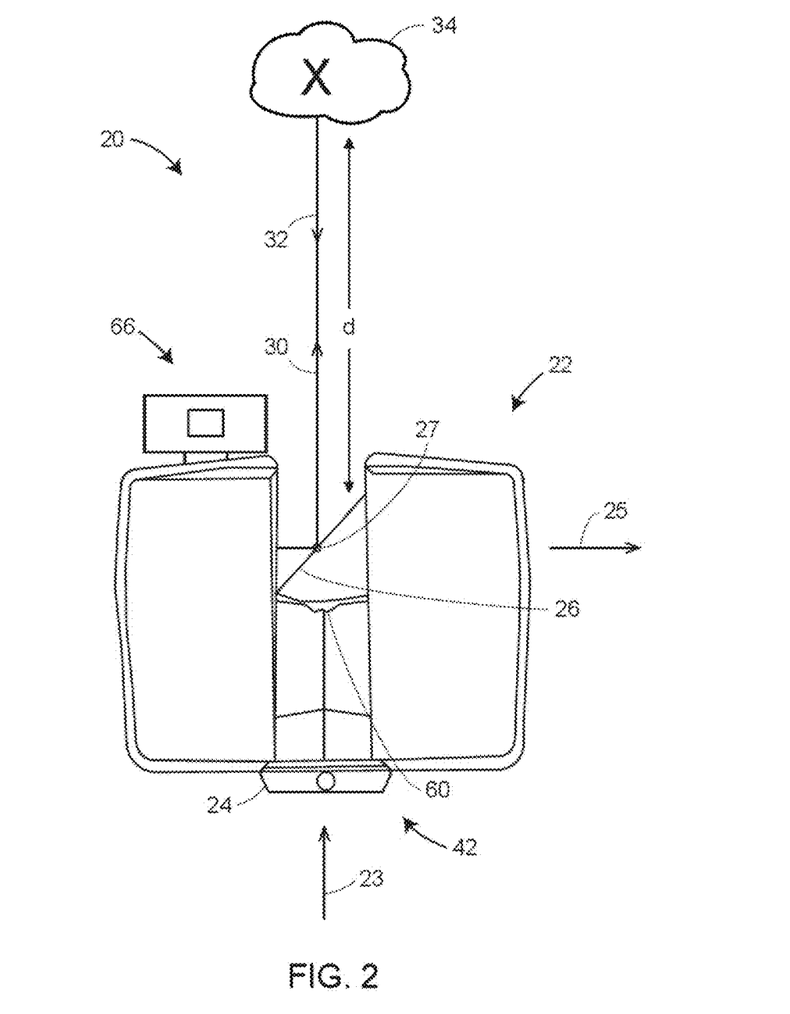
FIG. 2 is a side view of the laser scanner illustrating a method of measurement according to an embodiment.
Figure 3:
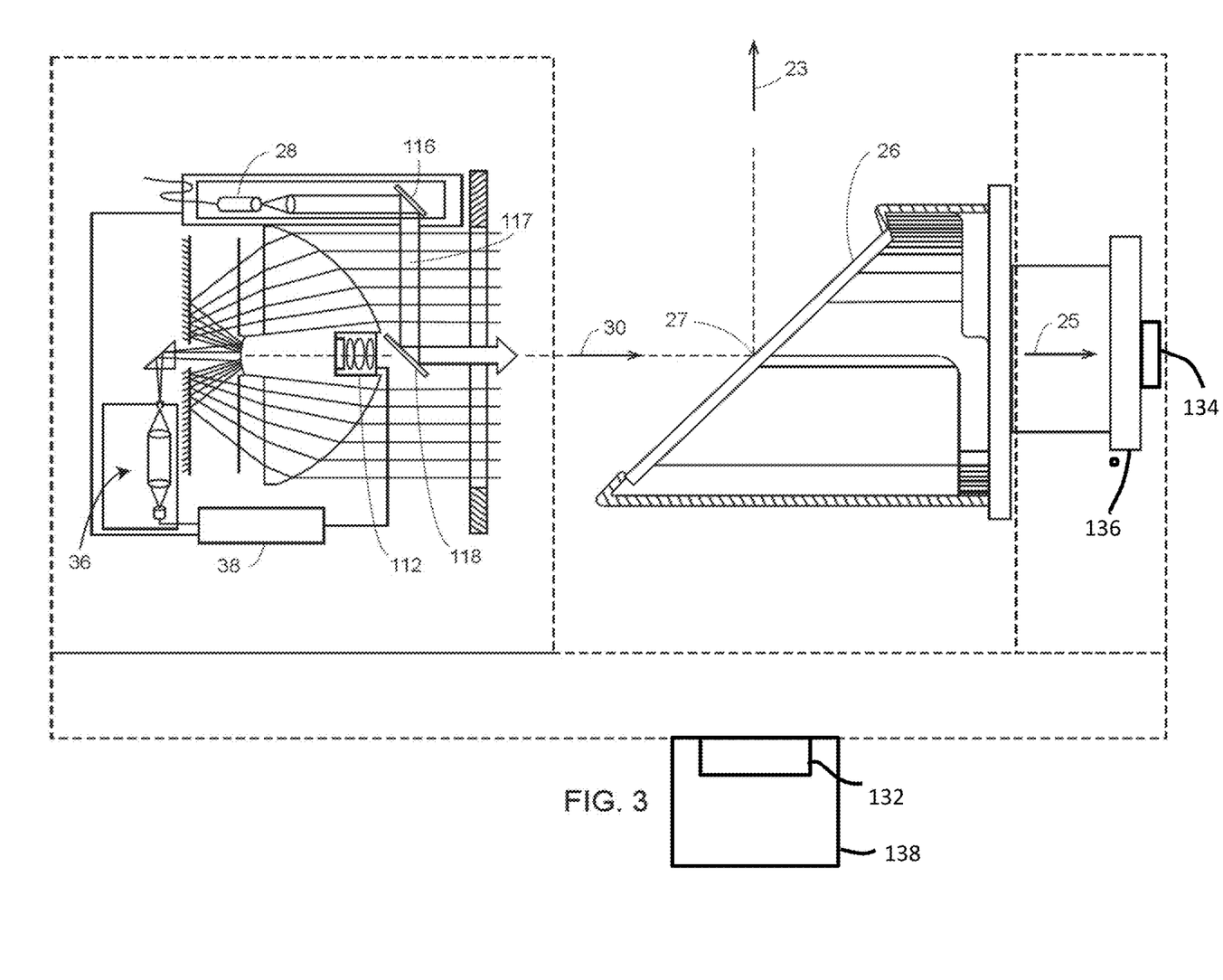
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to the vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example, 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions, in turn, depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray scale information related to the received optical power (equivalent to the term "brightness"). The gray scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near-infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
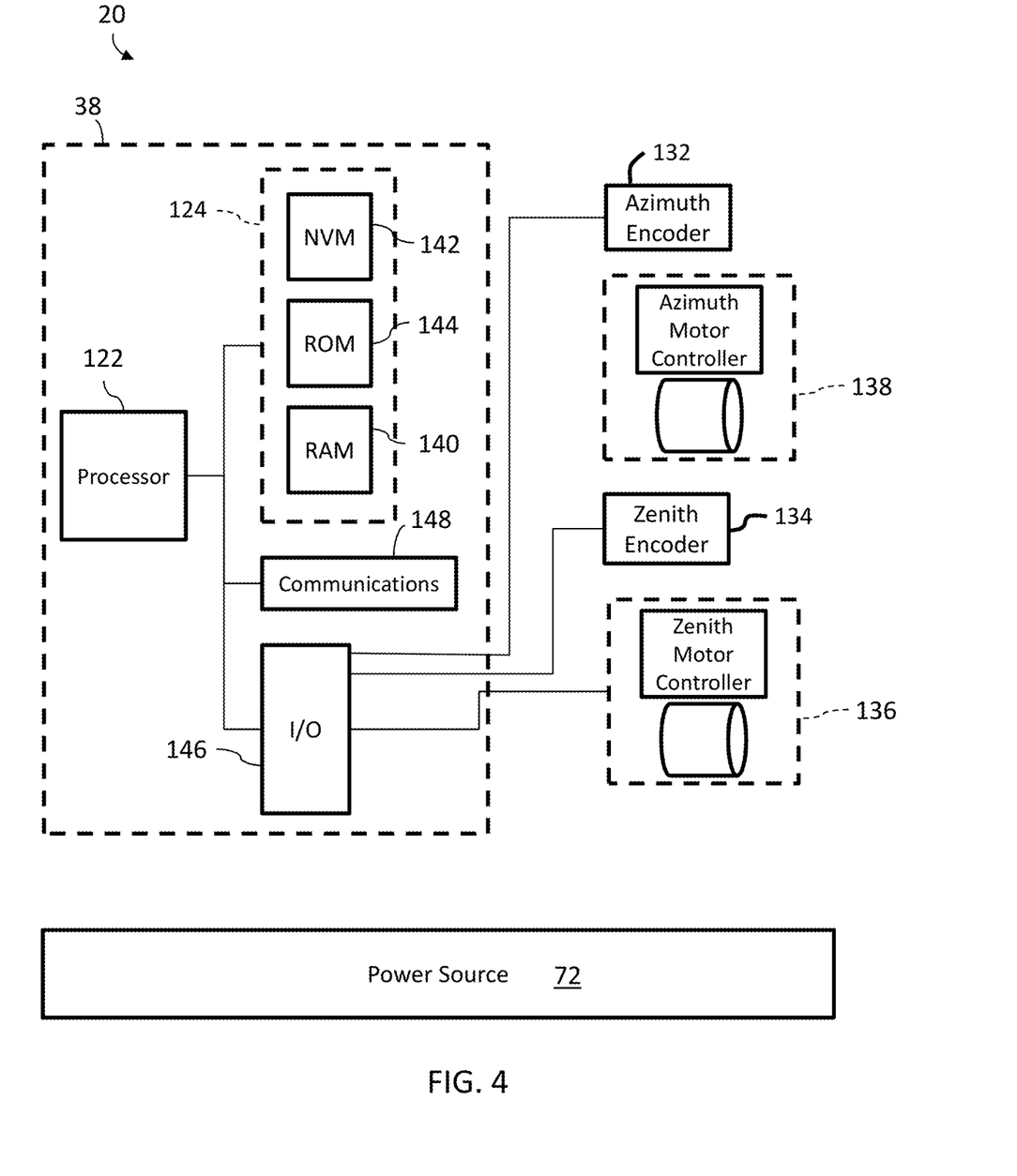
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to the distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(^) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5:
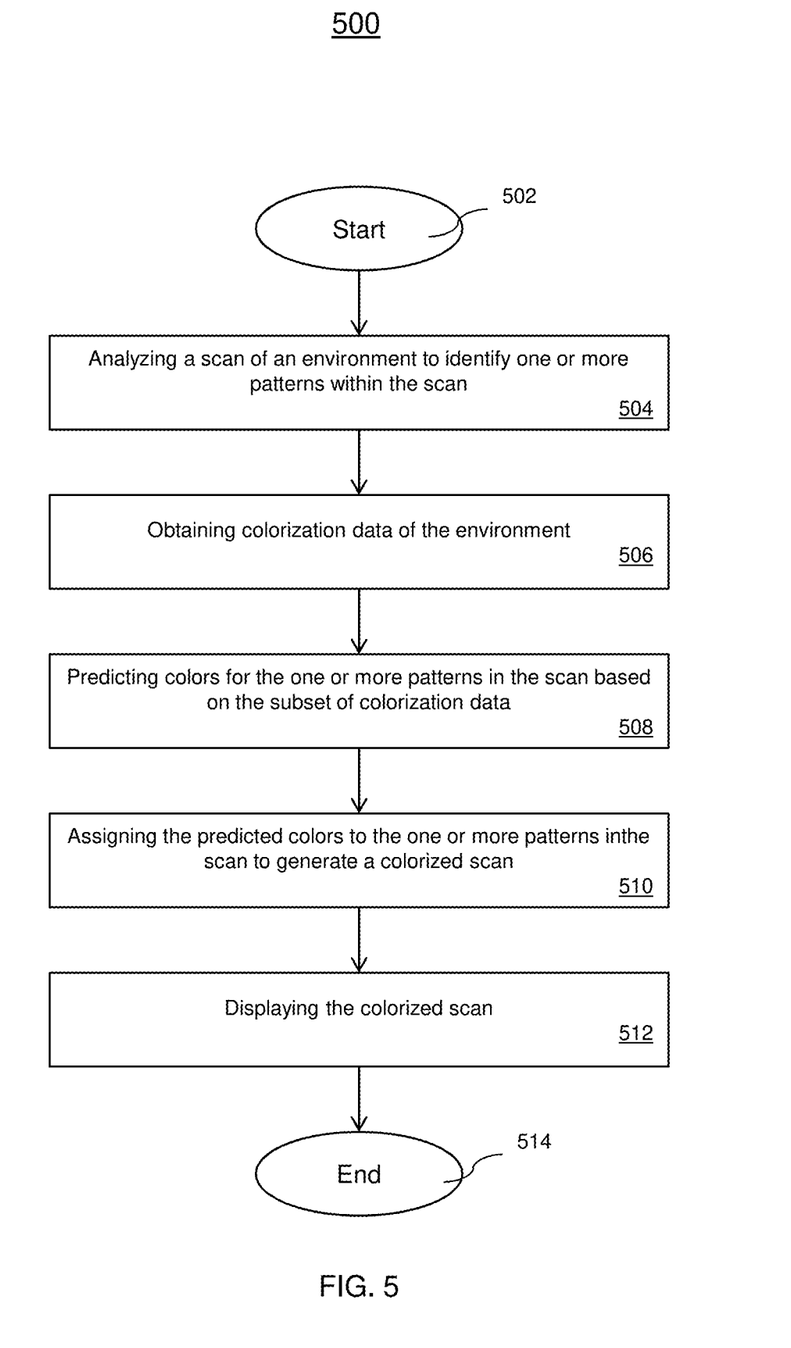
FIG. 5 depicts a flowchart of a method for performing the colorization of a scan using artificial intelligence in accordance with one or more embodiments.

Now referring to FIG. 5, a flowchart of a method 500 for performing AI colorization in accordance with one or more embodiments of the invention is shown. The processing of the input scan can be performed in the scanner device, the system, or a combination thereof. The method begins at block 502 and proceeds to block 504 which provides for analyzing a scan of an environment to identify one or more areas or patterns within the scan. In one or more embodiments of the invention, the input scan is provided to a processor to obtain the scan data. It should be understood the processor can be part of the scanning system, part of an external system, or a combination thereof. The scan that is analyzed can include an infrared scan, grayscale, or any other type of scan data. In one or more embodiments of the invention, the input scan data can include a panorama of the scanned environment (including the intensity, depth, and/or further data for the environment). It should be understood the input data is not limited to that described herein but can include other types of input data. The input data scan can include color pictures, infrared images, and/or gray scale images. In addition, the input data can be provided to a processing module as a file or other type of image data representing the scanned environment.

The input data can be obtained using a number of methods. For example, a scanner can emit laser light to scan an object and/or environment to produce a point cloud. The point cloud is a set of data points in space which can be produced by the 3D scanners. The scanner may use the time of flight methods for determining 3D coordinates as described herein with respect to FIGS. 1-4. As used herein, the term "point cloud" refers to a set of 3D measurements recorded during a scan. The 3D coordinates can be complemented by a gray scale or color value or other data representing values such as, but not limited to: the temperature, and the distance to another object. The laser is used to determine the distance on the basis of a phase-based time of flight method. In another non-limiting example, the laser can be pulsed at 50 kHz or another frequency/rate and the distance determined using a pulse propagation time method. In other embodiments, a continuous wave laser.

In the event a point cloud obtained using infrared light is input into the system to be colorized, the processor of the system is used to convert or translate the infrared values to gray scale values. Because infrared data is based on the reflectance of the material that is scanned, the scanned image must be further processed prior to colorizing the scanned image. This can be accomplished by using existing techniques to reduce the complexity of the infrared data. The gray scale values are assigned to the coordinate points of the scanned image based on the received optical power (reflectance). Gray scale values indicate the relative amount of light reflected by objects and represent to some extent how objects are perceived by a human eye (a black-and-white or gray version of human vision). In general, gray scale values are based on the optical powers in reflected light received by an optical detector. In the embodiments considered herein, and quantity related to the returned optical power is a valid measure of gray scale value.

At block 506, a subset of colorization data of the environment is obtained. The colorization data can be captured by a device such as a color camera, such as color camera 112, or auxiliary image acquisition device 66. The device can also include a mobile device that can be coupled to the scanning device or system. It should be understood that different types of external devices such as external cameras can be used to obtain image data having low resolution color panorama data. The subset of colorization data of the environment of the original scan is not required to include a complete representation of the environment. That is, the subset of colorization data is less than the entire environment. Any missing colorization data can be predicted by the artificial intelligence based on the CNN further described below.

At block 508, the processor predicts colors for the one or more patterns of the scan based on the subset of colorization data. The prediction is configured to identify patterns within the scan. In a scenario where a complete set of colorization is not obtained, the processor is configured to predict the colors that are to be applied to the patterns or objects.

In an embodiment, existing colorized point cloud data sets that were colorized using prior art techniques (e.g. manual techniques) may be used for training the model. In an embodiment, the training allows the model to predict color based on intensity values of the points in the point cloud. The AI is trained on the input of intensity and color (optional). During training, the weights of the neural network are adapted over time, enabling it to transform the input data into the output data. After the model is trained, a validation dataset is used to tune the parameters of the model. Finally, a test dataset can be used to assess the performance of the model. The test dataset generally applies combinations of inputs to the model that the model has not been previously trained. If the results are satisfactory the model is used to make predictions. Otherwise, the model can be trained, validated, and tested again until the model is optimized. In one or more embodiments of the invention, if enough training data is provided where the training data is based on the scan data with "real" color information, the AI-predicted color can be improved.

A convolutional neural network, such as the s-shape network, is a type of artificial neural network architecture that is particularly powerful regarding computer vision applications. Convolutional neural networks are less complex when compared to other image classification algorithms.

In one or more embodiments of the invention, a threshold number of seed images can be provided to the system. The seed images are used to train the CNN which is then used to make predictions to colorize the identified patterns or objects of the image data. In one or more embodiments of the invention, the seed images can be used to identify patterns or objects that are present in the image. For example, the seed image(s) can include a sidewalk, a portion of the grass, street, trees, people and more. In addition, the seed images can be used to identify the edges of the objects in the scan.

In some embodiments, additional RGB photos can be obtained to obtain some color information to resolve uncertainties in the image. In one or more embodiments, the system can request additional color images of the environment to resolve any remaining uncertainties in the colorization of the scanned image. The additional color images can be obtained using a color camera that is coupled to or attached to the scanner or mobile device (e.g. color camera 112 or auxiliary image acquisition device 66). In another embodiment, the colorization data can be obtained with a separate camera or a file have colorization data can be provided to the system to further train and/or updated the AI model for predicting the colorization of the environment.

In one or more embodiments of the invention, an edge detection process can be used to identify objects within the scanned image. One edge detection technique that may be used is the Canny edge detection process. If a processor of the system performing the analysis finds a matching edge between the scanned data and the reference image the matching edges can indicate the same object. This can be used to consistently colorize the objects of an analyzed image. For example, if a road or sidewalk is identified it can be consistently colored for different scans. That is, the roads or sidewalks that are identified can be colored gray across a number of scanned images.

Global knowledge of the trained AI is used to achieve consistent colors in the same object. In one or more embodiments of the invention, a number of images can be obtained and stored in a database accessible to the system to collect color information from the environment, where the color information can be used as a color palette for the image and/or specific objects. The objects can be colorized by resolving uncertain predictions. In addition, the colors can be consistently assigned to the objects, e.g. by matching edge-based features as described above.

In one or more embodiments, other types of neural network architectures can be used.

At block 510, the predicted colors are assigned to the one or more objects of the scan to generate a colorized point cloud. At block 512, the colorized scan is displayed, wherein the colorized scan combines the point cloud and the predicted colorization data by assigning the predicting colorization to the scan. The colorization information is applied to a point cloud which provides additional information such as depth information, height information, etc. Colorizing the point cloud provides a "real-world" depiction of the scene or environment and an enhanced visual image compared to a reflectance image. The method 500 ends at block 514.

It should be appreciated that while embodiments herein refer to the systems of FIGS. 1-4 as being used in connection with a laser projection system, this is for example purposes and the claims should not be so limited. In addition, it is to be understood that the steps described with reference to FIG. 5 are not intended to limit the scope of the invention.

Figure 6A:
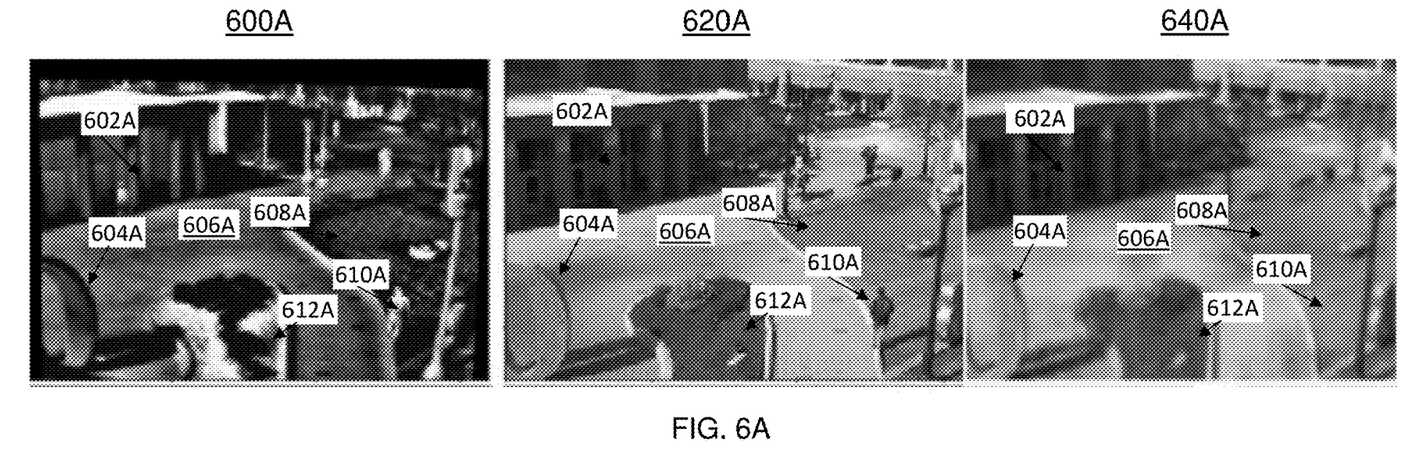
FIGS. 6A and 6B depict an example illustration of the colorized scans from performing the AI-based colorization in accordance with one or more embodiments of the invention.
Figure 6B:
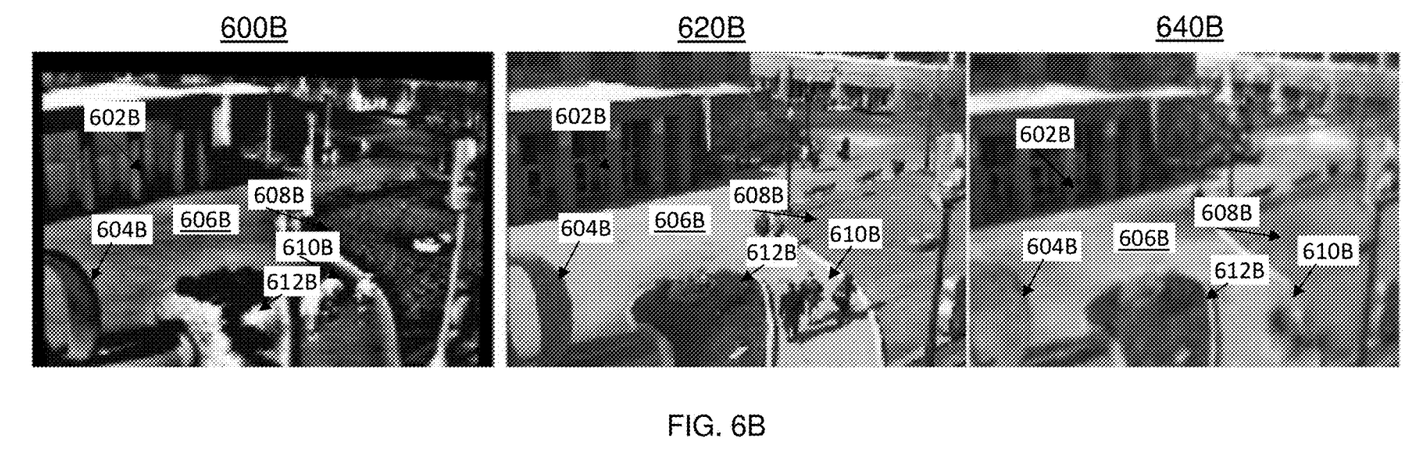

FIGS. 6A and 6B depict a series of images illustrating the colorization process in accordance with one or more embodiments described herein. FIG. 6A depicts a series of 3D point clouds 600A, 620A, and 640A of an environment.

The initial scan 600A can be obtained by a scanning device or input into the processing system as a data file. In this example, a number of objects are shown such as a building 602A, a structure 604A, a sidewalk 606A, a patch of grass 608A, a person 610A, and mulched area 612A. Although the initial 3D point cloud 600A is shown as a gray scale image, it should be understood the initial scan could be performed using visible light or infrared light for example.

The image 620A depicts the result of a colorization performed by the AI as described herein. The image is colorized using an edge detection process using the S-shape network. The AI performs object recognition and maps the colorization data to the objects. In this example, the AI has identified the building 602A and colored it brown. The structure 604A has been identified and colored green. The sidewalk 606A is colored grey, and the patch of grass 608A has been colored green. The person 610A has been colored, and the mulched area 612A is colored brown. The image 620A is also a result of an edge detection process which provides a cleaner image compared to image 640A.

The image 640A illustrates the colorization of the image in accordance with one or more embodiments of the invention. In this example, the colorization prediction is based on a non-edge-aware CNN. The colorized output image can be displayed on a device. As shown, image 620A is sharper than the image shown in FIG. 620A. Portions of the image 640A are not as defined. For example, the grass 608A is not as defined and the person 610A shown in images 600A and 620A is not shown in 640A. However, the image 640A provides the colorized data for the environment. The colorized output 3D point cloud can be displayed on a device, scanner, or another computing system.

FIG. 6B depicts a series of images 600B, 620B, and 640B of an environment. The initial scan 3D point cloud 600B can be obtained by a scanning device or input into the processing system as a data file. In this example, a number of objects are shown such as a building 602B, a structure 604B, a sidewalk 606B, a patch of grass 608B, a person 610B, and mulched area 612A. Although the initial scan point cloud 600A is shown as a gray scale image, it should be understood the initial scan could be performed using visible or infrared light. Similar to point cloud 620A, the point cloud 620B provides a colorized image using the AI in accordance with one or more embodiments of the invention. The point cloud 620B was processed using an edge detection process. The point cloud 640B illustrates the colorization of the scan in accordance with one or more embodiments of the invention, where the colorization prediction is based on a non-edge-aware CNN. As shown, the edge-aware point cloud image is more defined when compared to the non-edge-aware point cloud image, but both point clouds include the added colorized detail for the viewer.

It should be appreciated that while embodiments herein described the point cloud as being generated by a time-of-flight scanner, this is for example purposes and the claims should not be so limited. In other embodiments, the point cloud may be generated by other types of scanners, such as but not limited to: area scanners, triangulation scanners, structured light scanners, and laser line probes for example.

The technical effects and benefits include providing an efficient colorization of existing scans. In addition, the technical effects and benefits include colorization of not only grayscale scans but also colorizing scans based on reflectance such as those scans obtained using infrared. This can lead to reduced measurement time. Although in some embodiments, the colorized image is not as accurate as colorizing the image by performing a subsequent colorization scan to obtain the complete colorization data, the techniques describe an efficient technique to add color to the images using AI based on a CNN to predict the colorization data for the scanned image. The technical effects and benefits balance the image quality and measurement time to obtain a colorized image from a reflectance-based scan.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A method for performing colorization of scans, the method comprising:
    analyzing, using a scanner, a scan of an environment to identify one or more patterns within the scan;
    obtaining a subset of colorization data of the environment;
    predicting, using a processor, colors for the one or more patterns in the scan based on the subset of colorization data;
    assigning the predicted colors to the one or more patterns in the scan to generate a colorized scan; and
    displaying the colorized scan, wherein the colorized scan combines the scan and the predicted colorization data by assigning the predicted colorization data to the one or more patterns in the scan.

2. The method of claim 1, further comprises generating scan point cloud data from the scan.

3. The method of claim 1, wherein the subset of colorization data of the environment is less than a complete set of colorization data of the environment.

4. The method of claim 1, wherein the colorization data is obtained after an initial scan of the environment is obtained.

5. The method of claim 1, wherein the scan of the environment is an infrared scan, wherein the scan is based on a reflectance of light.

6. The method of claim 5, further comprising converting the infrared scan data into gray scale values prior to colorizing the scan data.

7. The method of claim 1, wherein the prediction is based on a convolutional neural network.

8. The method of claim 7, wherein the prediction uses a threshold number of seed images.

9. The method of claim 1, wherein the colorization data is obtained by a color camera device coupled to the scanning device.

10. The method of claim 9, wherein the camera is a panoramic camera operable to obtain low resolution colorization data.

11. The method of claim 10, further comprising obtaining, using the camera, the low resolution colorization data;
    obtaining, using a laser, intensity information to provide as input data to a convolutional neural network; and
    generating high resolution colorized scan data for the scan by combining the low resolution colorization data and output data from the convolutional neural network.

12. A system configured to colorize scans, the system comprising:
    one or more processors; and
    at least one memory, the memory including instructions that, upon execution by at least one of the one or more processors, cause the one or more processors to be operable to:
        analyze, using a scanner, a scan of an environment to identify one or more patterns within the scan;
        obtain a subset of colorization data of the environment;
        predict, using a processor, colors for the one or more patterns in the scan based on the subset of colorization data;
        assign the predicted colors to the one or more patterns in the scan to generate a colorized scan; and
        display the colorized scan, wherein the colorized scan combines the scan and the predicted colorization data by assigning the predicted colorization data to the scan.

13. The system of claim 12, wherein the scan of the environment is an infrared scan, wherein the scan is based on a reflectance of light, where the infrared scan is converted into gray scale values prior to colorizing the scan data.

14. The system of claim 12, wherein the subset of colorization data of the environment is less than a complete set of colorization data of the environment.

15. The system of claim 12, wherein the prediction is based on convolutional neural network, wherein the prediction requires a threshold number of seed images.

16. The system of claim 12, wherein the colorization data is obtained after an initial scan of the environment is obtained.

17. The system of claim 12, wherein the scan of the environment is obtained using a scanner that is based on at least one of time-of-flight measurements, phase shift measurements, or a pulsed laser, wherein the scanner is a rotating scanner.

18. The system of claim 12, further comprising a color camera device, wherein the color camera device is configured to obtain colorization data.

19. The system of claim 18, wherein the color camera device is a panoramic camera operable to obtain low resolution colorization data.

20. The system of claim 19, wherein the scanner obtains intensity information to provide as input data to a convolutional neural network; and
    wherein the one or more processors are operable to generate high resolution colorized scan data for the scan by combining the low resolution colorization data and output data from the convolutional neural network.

* * * * *